United States Patent Office 2,720,403
Patented Oct. 11, 1955

2,720,403

MEANS FOR REGULATING THE INCLINATION OF A VEHICLE BODY

Herschel B. Martin, New Rochelle, N. Y., assignor of one-half to Henry Gries, Brooklyn, N. Y.

Application February 18, 1954, Serial No. 411,203

6 Claims. (Cl. 280—112)

The present invention relates to improvements in vehicle bodies and particularly to a means for regulating the transverse inclination of the body in order to prevent the shifting of passengers or cargo resulting from centrifugal force.

When a vehicle follows a curved path the passengers or cargo tend to shift toward the outer side of the vehicle, with the result that discomfort is felt by passengers and, in the case of a cargo load, the load shifts its position and is damaged, this being especially true where the cargo is, for example, livestock.

My present invention supplies a regulating system which causes the vehicle body to be inclined so that the outer side thereof is higher than the inner side, thus preventing the shifting above-mentioned and adding greatly to the safety and comfort of passengers and likewise preventing damage to cargo.

As will be obvious, the amount of centrifugal force which must be compensated for depends both upon the radius of the curve traversed and upon the speed of the vehicle. The device of the present invention operates to an extent determined both by the turning movement of the steering wheel, or a part connected thereto, and by means controlled by the vehicle speed. Additionally, it is undesirable that the device be operable on a curved surface which is banked and, therefore, additional speed control means are provided to overcome the action of the first speed control means at speeds above a predetermined limit, which limit may represent the maximum which would be employed on an unbanked surface.

It is an object of the invention to provide a means for adjusting the position of a vehicle body about its longitudinal axis to approximately compensate for centrifugal force set up in travelling around curves and which would tend to prevent shifting of the passengers or the cargo load.

It is another object of the invention to provide such a device wherein the degree of tilting of the vehicle body is dependent upon the radius of the particular curve being traversed.

It is a further object of the invention to provide means for regulating the degree of tilting in accordance with the speed of the vehicle.

It is a still further object of the invention to provide means for overcoming the action of the last-mentioned means so that the degree of tilting will be adjusted for those highways which are designed for high-speed traffic and have banked curves.

Figure 1:
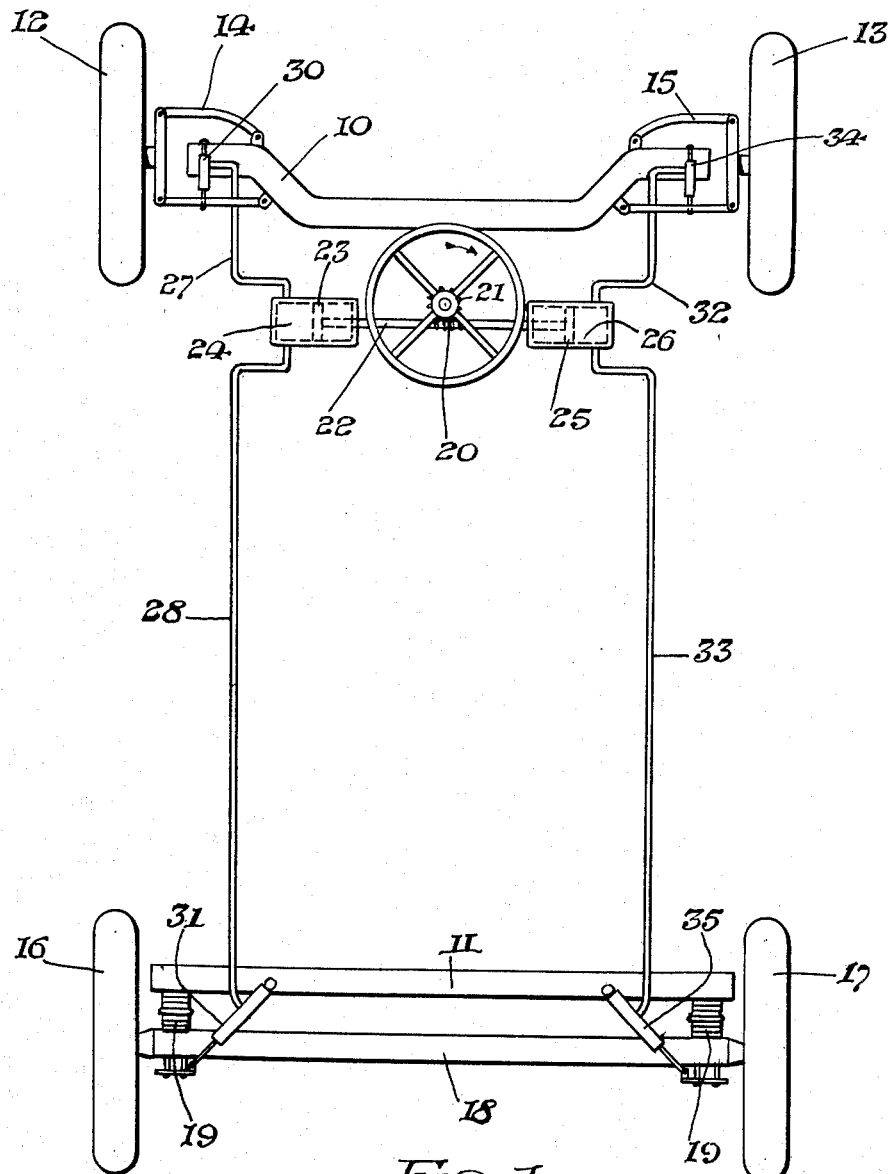
Figure 2:
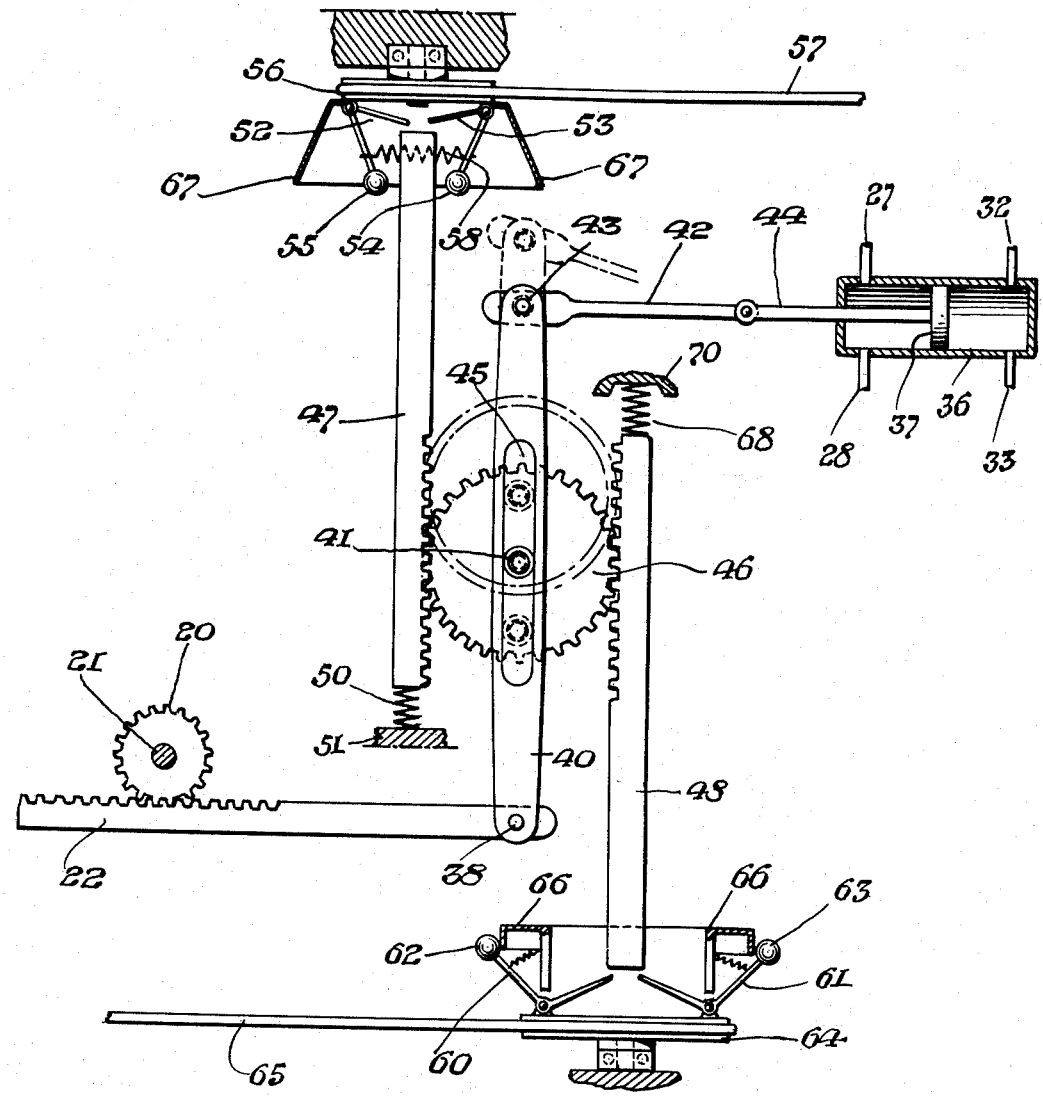

Other objects and features of the invention will be apparent when the following description is considered in connection with the annexed drawings, in which, Figure 1 is a schematic view of a vehicle running gear including front and rear axles and wheel suspensions showing the application of my invention to a usual type of automotive vehicle; and Figure 2 is a detailed view showing one mode of modifying the adjustment made in accordance with curvature by a second adjustment made in accordance with vehicle speed.

Referring now to Figure 1, there is shown at 10 the front frame member and at 11 the rear frame member of an automotive vehicle, the front wheels 12 and 13 being connected to the frame member 10 by means of the common knee action suspensions 14 and 15, the suspensions being shown in purely diagrammatic form.

The rear wheels 16 and 17 together with the rear axle 18 are connected to the rear frame member 11 by another common form of suspension comprising the elliptic leaf springs 19.

In accordance with my invention a pinion 20 is mounted upon or geared to the steering column 21 and this pinion meshes with a rack 22. Rack 22 is connected at its left end to a piston 23 operating in a cylinder 24 and similarly connected at its right hand end to a piston 25 operating in a cylinder 26. Cylinder 24 is connected by means of the pipes 27 and 28 to the front wheel cylinder 30 and rear wheel cylinder 31 respectively. Cylinder 26 is connected by means of pipes 32 and 33 to the front wheel cylinder 34 and rear wheel cylinder 35 respectively. The cylinders 24, 26, 30, 31, 34 and 35 are filled with hydraulic fluid so that pressure upon the pistons 23 or 25 will be transmitted to the respective cylinders 30, 31, or 34, 35.

Wheel cylinders 30, 31, 34, 35 are provided with pistons which, in the case of the front wheel cylinders 30, 34, act upon the wheel suspensions 14 and 15 respectively, the cylinders of course being connected directly to the frame member 10. In like manner the rear wheel cylinders 31 and 35 are connected to the frame member 11 and are provided with pistons which act upon the springs 19 and axle 18.

Thus, for example, as the steering wheel is turned in order to round a right hand curve, rack 22 is caused to move and to force the piston 23 in the direction to increase the pressure in cylinder 24 while moving the piston 25 in the opposite direction to decrease the pressure in the cylinder 26. Since the direction of movement of the rack is such as to increase the pressure in the wheel cylinders on the outer side of the vehicle as respects the particular curve traversed, and to diminish the pressure in the wheel cylinder on the inner side of the frame, the vehicle body will be elevated on the outer side and lowered on the inner side. As a result, the horizontal component of centrifugal force will be partially compensated for since the frame and body, including cargo, platform and seats, will be sloped in a direction to oppose this horizontal centrifugal force component.

The device as described above aids materially in promoting the comfort of passengers and in increasing the safety of cargo. However, the device as described above is dependent entirely upon the degree of curvature of the curve traversed for its regulating action, whereas not only the curvature of the road, but also the speed of the vehicle determines the amount of centrifugal force which results.

In order that the angle of inclination of the vehicle frame and body be such as to provide a force counteracting the effect of centrifugal force (and neglecting the relatively minor effect of friction), the following equation must be satisfied:

$$f = m \tan \theta$$

in which $f$ = the force necessary to resist centrifugal force
$m$ = the mass of passenger or cargo
and
$\theta$ = the angle of the frame to the horizontal.

The centrifugal force exerted upon a body is expressed by the equation $$F = \frac{mV^2}{r}$$

in which
F=centrifugal force
V=the velocity of the vehicle
and
r=the radius of a curve traversed.

Since the counter force $f$ must equal the centrifugal force F it follows that $$m \tan \theta = \frac{mV^2}{r}$$

and $$\tan \theta \text{ equals } \frac{V^2}{r}$$

Although as is clear from the above equation, the tangent of the required angle of tilt is not a linear function of the radius of curvature but is rather a hyperbolic function, nevertheless it can be shown that for practical ranges of radius of curvature, namely, from a few feet to a fraction of a mile, the change in the tangent of the angle $\theta$ and the angle in degrees will have a substantially uniform variation and therefore, in the ranges considered, the tilt may be directly proportioned to the radius of curvature or the steering wheel movement as described above, neglecting of course the centrifugal force variation resulting from changes in velocity.

The velocity component of the equation appearing above shows that the angle of inclination of the frame to the horizontal varies at an exponential rate with respect to velocity. However, if the lower speeds such as up to 50 miles an hour are considered, the variation of angle of inclination with velocity may be assumed to be approximately linear and, therefore, a mechanism which modifies the effect of steering movement on the tilt angle by a simple linear relationship approximately proportional to velocity will yield a resulting angle of tilt which will produce a force balancing the centrifugal force for all practical purposes.

In Figure 2 there is disclosed additional mechanism which cooperates with that described hereinabove to produce a regulating action dependent upon both radius of curvature and vehicle speed.

In the device shown in Figure 2 the cylinders 24 and 26 have been combined into a single cylinder designated 36 this cylinder having a single piston 37 which replaces the pistons 23 and 25. In the arrangement shown in Figure 2 the rack 22 is connected at one end by means of the pin 38 to a lever 40 which is fulcrumed at 41. The opposite end of lever 40 is connected, by means of a link 42 pivoted to the lever at 43, to the piston rod 44 of the piston 37. Thus as the pinion 20 is rotated in response to movements of the steering column 21, the piston 37 is moved to the left or to the right increasing the pressure in the conduits or pipes 27 and 28 and decreasing the pressure in pipes 32 and 33, or vice versa. The lever 40 is pivoted, as stated, on a pin 41 which pin operates in a slot 45 in the lever 40. Pin 41, in the embodiment of the invention shown, is the hub of a gear 46 which gear meshes with a rack 47 at its left hand side and with a rack 48 at its right hand side.

The rack 47 is mounted in any suitable manner for movement longitudinally (vertically as seen in Figure 2) and is spring-pressed in one direction by means of a coil spring 50 positioned between one end of rack 47 and a fixed portion 51 of the vehicle. The opposite end of rack 47 is in alignment with levers 52 and 53 which levers are portions of a governor mechanism comprising the bell cranks 52 and 53 together with the balls 54 and 55. The disk 56 on which the governor bell crank levers 52 and 53 are mounted is rotated by means of a belt 57, or any other suitable manner, at a speed proportional to the vehicle speed. Belt 57 may, for example, be driven from the vehicle drive shaft or from any other vehicle motor part, the speed of which is directly proportional at all times to the vehicle speed.

Thus as the vehicle speed increases, the governor bell crank levers 52 and 53 are caused to move, overcoming the tension of the governor spring 58. This results in movement of the rack 47 downwardly as seen in Figure 2 carrying the gear 47 downwardly since it rolls upon the now stationary rack 48. This results in a shortening of the lever arm between the fulcrum 41 and pivotal connection 38 and a corresponding lengthening of the lever arm between the fulcrum 41 and the pivotal connection 43, thereby causing increased travel of the piston in a direction determined by the direction of movement of the pinion 20. As a result the degree of inclination of the vehicle frame and body is determined by both the radius of the curve traversed and the speed at which this curve is traversed.

In many instances highways are designed for relatively high speed traffic and as a result the curves are banked to permit such high speeds without excess danger. When this is done, it is not desirable that the vehicle body be tilted by an amount such as would result from the mechanism previously described. For this reason the rack 48 is arranged to be operated by a second governor comprising the bell cranks 60 and 61 having the usual ball ends 62 and 63, this governor comprising the disk 64 on which the bell cranks are mounted, the disk being rotatable and being driven by a belt 65 or in any other manner which, like belt 57, is driven from a suitable element of the vehicle which rotates at a speed in direct proportion to the vehicle speed. It will be noted that a stop disk 66 is provided radially inwardly of the balls 62 and 63 rendering the governor ineffective at speeds below a predetermined speed. Conversely, the governor heretofore described and comprising the bell cranks 52 and 53 is provided with a disk 67 which limits the radial outward movement of the balls 54 and 55, rendering this governor ineffective above the particular predetermined speed. The stops 66 and 67 are set so that the first governor is effective up to a speed of say 50 miles per hour and the second governor is effective at speeds in excess of 50 miles per hour, this setting being based on the assumption that highways having unbanked curves will not be negotiated at speeds in excess of 50 miles per hour and that highways which are negotiable in excess of 50 miles per hour have banked curves.

Rack 48 is spring pressed in one direction by means of a compression spring 68 extending between the end of the rack and a fixed part 70 of the vehicle. Arms of the bell crank levers 60 and 61 bear against the opposite end of rack 48 and thus serve to urge that rack in a direction opposite to that on which it is urged by spring 68.

Thus when the vehicle exceeds the predetermined speed, the rack 48 moves longitudinally (upwardly as seen in Figure 2) and causes the gear 46 to roll on the rack 47. This results in an action opposite to that produced by rack 47, namely, a shortening of the piston lever arm and a lengthening of the steering rack lever arm which in turn cancels out the effect of the first governor so that at higher speeds (say above 50 miles per hour) the tilting action of the vehicle frame and body becomes progressively less and, at extremely high speeds, this tilting action is proportional to the turning movement of the steering wheel only. In fact, at very high speeds the movement of the rack 48 may be great enough so that the tilting action is less than would normally result from a movement of the steering wheel alone.

It will be realized that since highways designed for high vehicular speeds do not have sharp curves, the effect of the steering wheel movement will be very slight and substantially no tilting will therefore result.

Although the device has been described as being hydraulic it will be realized that other fluid pressure systems may be utilized and, further, that electrical systems or purely mechanical systems may be substituted for the hydraulic system here disclosed.

It will be understood that the device described may be applied to the trailer portion only of a trailer combination so that shifting of the trailer load is prevented and that such an arrangement is included in the claims wherein a steerable vehicle is specified.

Since the above and other modifications may readily be made, it will be understood that I wish not to be limited by the foregoing description which was given solely for the purposes of illustration, but on the contrary, to be limited only by the claims granted to me.

What is claimed is:

1. In a device for adjusting the inclination of the frame of a steerable wheeled vehicle about the longitudinal axis thereof, in combination, a plurality of fluid pressure cylinders, each having a piston therein, one of said cylinders being connected to the vehicle frame adjacent each of the vehicle wheels, the corresponding piston being connected to the wheel, a pressure fluid master cylinder having a piston therein, conduits connecting said master cylinder to said wheel cylinders, said conduits at one side of said master cylinder piston connecting to the wheel cylinders at one side of the vehicle and those at the opposite side of the master cylinder piston connecting to the wheel cylinders at the opposite side of the vehicle, a pinion gear driven by the steering mechanism, a rack operated by said pinion gear, a lever connecting said rack to said master cylinder piston, a slot in said lever, a gear having a hub extending into said slot, said hub forming the fulcrum for said lever, said gear being mounted for movement longitudinally of said slot and for rotation, a normally stationary rack engaging said gear, a second rack engaging said gear, said second rack being spring pressed to an initial position, and a governor driven at a rate directly proportional to the vehicle speed, said governor having means engaging said second rack to operate it against said spring to a position determined by the vehicle speed and to thereby cause said gear to roll along said first rack and adjust the fulcrum point of said lever, whereby the pressure in the wheel cylinders on one side of the vehicle increases to an extent dependent upon the actuation of the steering mechanism as modified by the vehicle speed and the pressure in the wheel cylinders on the opposite side of the vehicle decreases to a corresponding degree.

2. In a device for adjusting the inclination of the frame of a steered wheeled vehicle about its longitudinal axis to provide a force for counteracting centrifugal force and preventing shifting of the load, in combination, means for adjusting the position of each wheel with respect to its adjacent point of connection to the vehicle frame, means operable by the vehicle steering means for operating the adjusting means on one side of the vehicle in one direction and those on the other side of the vehicle in the opposite direction simultaneously and to substantially the same extent, means driven in accordance with the vehicle speed for modifying the action of said operating means and means operable when the vehicle speed exceeds a predetermined limit for counteracting the action of said modifying means.

3. A device as claimed in claim 2, characterized in that said counteracting means comprises a governor driven at a rate directly proportional to the speed of the vehicle, and means rendering said governor ineffective at speeds below said predetermined speed.

4. A device as claimed in claim 2, characterized in that said operating means comprises a lever, said lever having an adjustable fulcrum point and further characterized in that said modifying means comprises a governor and means operated by said governor to adjust said fulcrum point to increase the effect of the ... nism of said operating means as the vehicle ... creases, and still further characterized in that said coun... acting means comprises a second governor and means to vary the position of said fulcrum point in a direction opposite to the variation brought about by said first governor to thereby decrease the effectiveness of the steering mechanism on said operating means when the vehicle speed has exceeded a predetermined limit.

5. In a device for adjusting the inclination of the frame of a steerable wheeled vehicle about the longitudinal axis thereof, in combination, a plurality of fluid pressure cylinders, each having a piston therein, one of said cylinders being connected to the vehicle frame adjacent each of the vehicle wheels, the corresponding piston being connected to the wheel, a pressure fluid master cylinder having a piston therein, conduits connecting said master cylinder to said wheel cylinders, said conduits at one side of said master cylinder piston connecting to the wheel cylinders at one side of the vehicle and those at the opposite side of the master cylinder piston connecting to the wheel cylinders at the opposite side of the vehicle, a pinion gear driven by the steering mechanism, a rack operated by said pinion gear, a lever connecting said rack to said master cylinder piston, a slot in said lever, a gear having a hub extending into said slot, said hub forming the fulcrum for said lever, said gear being mounted for movement longitudinally of said slot and for rotation, a first rack engaging said gear, a second rack engaging said gear, said second rack being spring pressed to an initial position, a governor driven at a rate directly proportional to the vehicle speed, said governor having means engaging said second rack to operate it against said spring to a position determined by the vehicle speed to thereby cause said gear to roll along said first rack and adjust the fulcrum point of said lever, means limiting the motion of said second rack under control of said governor, a second governor operating said first rack, said first rack being spring urged in a direction opposite to that in which said second rack is urged, and said second governor being limited in its movements so that it is ineffective at vehicle speeds at which said first governor is effective whereby the degree of inclination of said vehicle frame is increased in accordance with the radius of a curve traversed by a vehicle and the speed of the vehicle up to a predetermined speed and the degree of inclination is reduced from its maximum value when the predetermined speed is exceeded.

6. In a device for adjusting the tilt of a steered wheeled vehicle frame about its longitudinal axis to provide a force for counteracting centrifugal force and preventing shifting of the vehicle load, in combination, means for adjusting the position of each wheel with respect to its adjacent point of connection to the vehicle frame, means comprising a lever interposed between the vehicle steering mechanism and said adjusting means for operating the adjusting means on one side of the vehicle in one direction and those on the other side of the vehicle in the opposite direction simultaneously and to substantially the same extent, said lever having a longitudinal slot therein, a gear having a hub, said hub being mounted in said slot, a rack meshing with said gear, a governor and means operated by said governor to move said rack to thereby adjust the fulcrum point of said lever in a direction to increase the adjusting action of said adjusting means as the speed of the vehicle increases.

References Cited in the file of this patent

UNITED STATES PATENTS

| | | |
|---|---|---|
| 2,260,102 | Freret | Oct. 21, 1941 |
| 2,609,884 | Garcia | Sept. 9, 1952 |